United States Patent Office 2,916,462
Patented Dec. 8, 1959

2,916,462

3,4 MONOEPOXIDE OF CYCLOPENTADIENE AND ITS HOMOPOLYMER

Malcolm Korach, Corpus Christi, Tex., assignor to Columbia-Southern Chemical Corp., Allegheny County, Pa., a corporation of Delaware No Drawing. Application June 15, 1956
Serial No. 591,522

6 Claims. (Cl. 260—2)

This invention relates to a novel olefinically unsaturated cyclic epoxide, the monoepoxide of cyclopentadiene, and to its preparation from cyclopentadiene. It further relates to the homopolymerization and copolymerization of this epoxide and to the polymeric materials thereby provided.

While there are many known epoxides, the need still persists for a cheap, easily prepared epoxide which polymerizes and/or copolymerizes with ease. It is further advantageous that an epoxide contain an olefinically unsaturated group, e.g.

This olefinically unsaturated grouping may permit polymerization of the type effected by polymerizing the unsaturated linkage, or it may provide basis for cross-linking polymers and yielding polymers which are three-dimensional in character.

According to this invention, a novel olefinically unsaturated cyclic epoxide, the monoepoxide of cyclopentadiene (epoxycyclopentene) is provided. This epoxide is particularly reactive and polymerizes easily. It may be prepared inexpensively from cyclopentadiene. By virtue of its unsaturated grouping, polymers of the epoxy linkage (polyethers) are capable of being cross-linked to form three-dimensional type polymers. This epoxide is a high boiling liquid at atmospheric conditions. It boils at 52.7° C. at 89.5 millimeters of mercury pressure, has a melting point of minus 53° C. to minus 55° C. and has a viscosity at 25° C. of 0.6886 centipoises. Structurally, it may be represented by the following formula:

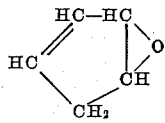

According to a further embodiment of this invention, the monoepoxide of cyclopentadiene is prepared by epoxidizing cyclopentadiene while avoiding serious by-product formation. This epoxide is unusually reactive to the extent that during its preparation it reacts easily. It has accordingly been discovered that epoxidation with peracids of cyclopentadiene to yield the monoepoxide of cyclopentadiene (epoxycyclopentene) is advisedly conducted under conditions which suppress the conversion of the product monoepoxide to other products.

According to the novel process of the present invention, cyclopentadiene is epoxidized to the monoepoxide of cyclopentadiene by reaction with a peracid of a relatively weak monocarboxylic acid such as peracetic acid in the liquid phase and in the presence of an inorganic buffer such as sodium carbonate. Effective epoxidation of cyclopentadiene depends upon peracids of weak organic acids and the presence of a buffer such as sodium carbonate. By relatively weak monocarboxylic acids, acids having a pK constant (the negative log of the acid's dissociation constant) of from 0.5 to 5 are intended. Typical weak acids, the peracids of which are herein contemplated include formic, acetic, benzoic, phthalic, trichloroacetic and pelargonic acids. Peracids of particularly weak acids such as acetic acid, or other monocarboxylic or organic acids having a pK value of about 3 to 5 appear most effective. The peracids may be preformed or formed in situ in the reaction medium.

In conjunction with use of peracids of weak organic carboxylic acids, epoxidation of cyclopentadiene is accomplished in a liquid reaction medium which includes sodium carbonate, or its equivalent. Without sodium carbonate by-product formation is excessive and isolation of the epoxide as such in yields comparing favorably with the consumption of reactants is not realized. Apparently, sodium carbonate suppresses undesirable competitive or side reactions.

A minimum of about one mole of sodium carbonate per mole of employed peracid, and preferably from 2 to 5 moles thereof per mole of peracid, constitutes sufficient sodium carbonate for the intended purpose. The total sodium carbonate requirements need not necessarily be included at the outset, although care should be taken to insure the presence of sodium carbonate throughout the major portion of the reaction; e.g. at least 80 percent of the time the epoxidation is being effected. Thus, sodium carbonate may be added stepwise usually by correlating its rate of addition with the amount of charged peracid as when peracid is itself slowly added. Optimum results are accomplished by including initially all the required sodium carbonate.

Sodium carbonate serves a purpose entirely different from materials such as sodium acetate and the like. The latter are often included in epoxidation reactions to counteract ill effects of sulfuric acid contamination in the peracid. Sodium acetate cannot be used in lieu of sodium carbonate to achieve the herein described benefits. Besides sodium carbonate, disodium hydrogen phosphate may be employed although with less effectiveness.

Ideally, the reaction is conducted in a reaction medium diluted with an inert water insoluble organic solvent. Halogenated methanes and ethanes, especially the chlorinated methanes and ethanes, such as chloroform, dichloromethane, monochloroethane, dichloroethane, etc., are especially suitable. Other water insoluble solvents inert under conditions of reaction, however, are useful. The preferred inert organic solvents are relatively low boiling, e.g. boil at atmospheric conditions below about 120° C. With low boiling inert organic diluents, separation of product is simplified since simple topping off of the solvent is adequate.

The following examples illustrate the preparation of the monoepoxide of cyclopentadiene:

EXAMPLE I

A 12 liter, 3 neck flask equipped with an 8 inch stainless steel blade powered by an Eberbach Power-Stir for agitation was charged with solid powdered sodium carbonate and dichloromethane, in the quantities listed in the hereinafter table along with 462 grams (7.0 moles) of cyclopentadiene. While vigorously stirring the suspension and maintaining it at 20° C. to 23° C., 1260 grams of peracetic acid solution of 42 percent strength (containing 7.0 moles of peracetic acid) were added slowly in one hour from a dropping funnel. Previously, the peracetic acid solution was treated with 41.4 grams of sodium acetate to remove any sulfuric acid contamination. Agitation of the reaction medium was continued for an additional hour after completing acid addition.

This product solution was analyzed for peracid content, filtered, and the filter cake washed twice with approximately 3500 milliliters of fresh methylene chloride, and the combined organic layers weighed and analyzed for epoxy oxygen content.

These combined organic layers were then distilled at reduced pressures and cuts taken as tabulated in a 20 plate Oldershaw column and the products recovered and analyzed.

The following table summarizes the experimental conditions and results of several preparations of the monoepoxide of cyclopentadiene according to the above procedure:

Table I

| Run | Moles of Na₂CO₃ per mole of Peracetic Acid | Milliliters of CH₂Cl₂ | Distillation and Product Recovery Reflux Ratio 3:1 | | | Weight of Fraction (grams) | Weight of Product (grams) | Weight Percent Yield |
|---|---|---|---|---|---|---|---|---|
| | | | Po Temperature, °C. | Cut Temperature, °C. | Pressure, Millimeters Mercury | | | |
| A | 2.30 | 7,000 | 40–90 | 22–20 | 20–21 | 257.1 | 180 | 31.3 |
| B | 1.18 | 4,000 | 41–150 | 24–25 | 21 | 334.7 | 208.0 | 36.3 |
| C | 1.25 | 4,000 | 50–63 | 26–33 | 21–24 | 545.3 | 230.0 | |
| | | | 70–120 | 34–40 | 22–24 | 272.0 | 35.4 | 46.3 |

In run A, the filter cake was not washed with methylene chloride which accounted for the somewhat lower yield.

Analysis of the reaction solution for its peracid content indicated essentially complete peracid consumption.

Washing of the product filter cake with methylene chloride or like inert water insoluble organic solvents such as the diluents for the reaction medium is advantageous. The monoepoxide of cyclopentadiene is apparently easily absorbed by sodium carbonate and the recommended washing recovers this absorbed product.

While the foregoing example epoxidizes at around 20 to 25° C., the reaction may be conducted over a much wider temperature range. Reaction temperatures may be as high as about 60° C. or even higher. Substantially cooler temperatures admitting of a liquid phase reaction, notably temperatures at which the reaction medium remains fluid, such as minus 10° C., are suitable. Reaction temperatures of 0° C. to 40° C. are most appropriate.

EXAMPLE II

A 1 liter, 4 neck flask was charged with 1.0 mole of sodium carbonate suspended in 200 milliliters of dichloromethane. Thereafter, 13.2 grams (0.20 mole) of cyclopentadiene was added and the mixture stirred vigorously. To this medium maintained at 40° C., a 40 percent solution of peracetic acid (0.2 mole of peracetic acid) was added from a dropping funnel over a period of 30 to 45 minutes to the contents of the flask. The peracetic acid had previously been treated with sodium acetate to remove sulfuric acid contamination. Agitation was continued for one and one-half hours after completing the acid addition. Then the solution was filtered to recover the solid buffer, and the organic layer was analyzed directly for epoxy oxygen.

Analysis of the crude solution showed a 30 weight percent conversion of the cyclopentadiene to the monoepoxide of cyclopentadiene.

EXAMPLE III

Sixty milliliters of methylene chloride were added to 90 grams (0.5 mole of peracetic acid) of 40 percent peracetic acid at 0° C. which acid had been previously treated with 2.96 grams of sodium acetate to remove sulfuric acid contamination. Agitation was then commenced and 0.55 mole of sodium carbonate was added. To this agitated solution which was maintained at 0° C., 33 grams (0.5 mole) of cyclopentadiene were added over a fifty-minute interval. The resulting suspension was agitated for an additional hour and filtered. Some 13 weight percent of the cyclopentadiene was converted to the monoepoxide of cyclopentadiene.

Besides peracetic acid, the previously enumerated peracids of weak organic carboxylic acids are useful. The following example illustrates this:

EXAMPLE IV

One hundred milliliters of dichloromethane having suspended therein 0.20 mole of sodium carbonate was charged to a 500 milliliter flask. To this mixture, 0.20 mole of cyclopentadiene was added. With the medium agitated and maintained at 25° C., 0.20 mole of perpelargonic acid dissolved in dichloromethane was fed over ten minutes. After filtering and washing the filter cake with fresh dichloromethane, the organic layer was analyzed for epoxycyclopentene (the monoepoxide of cyclopentadiene). A 32 percent conversion of cyclopentadiene to this epoxide was realized.

The monoepoxide of cyclopentadiene (epoxycyclopentene) is extremely soluble in benzene, acetone, ether, methanol, carbon tetrachloride, cyclohexene and chloroform. Clear solutions result from dissolving the epoxide in these solvents.

A 96 percent pure monoepoxide of cyclopentadiene had the following physical properties:

| | |
|---|---|
| Boiling point at 89.5 millimeters' mercury pressure _____ °C. | 52.7 |
| Melting point _____ °C. | −53 to −55 |
| $n_D^{25}$ _____ | 1.4575 |
| $d^{25}$ _____ | 1.0217 |
| Viscosity at 25° C. _____ | 0.6886 |

This epoxide may be hydrolized to its corresponding unsaturated cyclic diol, 3-cyclopentene-1,2-diol. Most effective hydrolysis is by refluxing the monoepoxide in neutral or essentially neutral (pH of 6.5 to 7.5) aqueous solution for several hours. Aqueous solutions containing acids or bases are not particularly recommended since they promote by-product polymerization during the hydrolysis. Hydrolysis may also be accomplished by adding the monoepoxide to water at say room temperatures and agitating. Even after short periods of agitation, substantial hydrolysis and diol formation is observed.

The following examples illustrate the ease with which the monoepoxide of cyclopentadiene may be hydrolized to 3-cyclopentene-1,2-diol:

EXAMPLE V

A solution comprising 4.1 grams of the monoepoxide of cyclopentadiene dissolved in 50 milliliters of water was refluxed for three hours. Analysis of the reaction products obtained by extracting the aqueous system with chloroform, evaporating the solvent and recovering the residue, showed 3-cyclopentene-1,2-diol present.

EXAMPLE VI 2.05 grams of the monoepoxide of cyclopentadiene was shaken with 50 milliliters of water at 25° C. for fifteen minutes. A 46 weight percent conversion of the monoepoxide to its corresponding diol, 3-cyclopentene-1,2-diol, was obtained.

The hydrolysis product of the monoepoxide of cyclopentadiene, namely 3-cyclopentene-1,2-diol, is useful for a variety of purposes in which unsaturated cyclic dihydroxy compounds are of value. One particular use is as a component in the preparation of polyurethanes, such as are prepared by the reaction of the diol with organic polyisocyanates, for example, 2,4-toluene diisocyanate. Polyurethanes so prepared are often rubber-like and can be used in lieu of other synthetic rubber or natural rubber for many purposes such as in the preparation of automobile tires.

By virtue of containing both an epoxy group and an unsaturated group, the monoepoxide of cyclopentadiene may be polymerized or copolymerized to yield valuable and useful polymeric materials. These polymerization products may be employed as adhesives, notably as metal adhesives, as surface coating components for metals, textiles, wood and glass. They may also be employed as paint constituents. When reacted with polycarboxylic acids or their anhydrides such as phthalic acid or phthalic anhydride, they give rise to polyester type materials which may be employed in the manufacture of paints, as molding powders, etc. They may also be reacted with other polyols, for example, bis-phenol A to provide important paint components.

The monoepoxide of cyclopentadiene herein provided can be readily homopolymerized to give a polyether in the presence of catalysts which are generally suitable for initiating and enhancing the polymerization of epoxy groups,

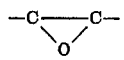

Typical of such catalysts are boron trifluoride, stannic chloride, aluminum chloride, ferric chloride, metallic sodium, etc. The monoepoxide of cyclopentadiene (epoxycyclohexene) differs in that it readily homopolymerizes under acidic or alkaline conditions. For example, this epoxide may be homopolymerized by heating in the presence of minor quantities of sodium hydroxide to yield hard, brittle polymers.

The following examples illustrate the manner in which homopolymerization may be conducted:

EXAMPLE VII

Five-thousandths of a mole of the monoepoxide of cyclopentadiene and 0.0005 of a mole of 0.1 normal sodium hydroxide were baked for sixteen hours at 110° C. There resulted a hard, brittle, reddish-brown polymer.

EXAMPLE VIII

A half gram of the monoepoxide of cyclopentadiene of approximately 50 percent epoxide was diluted with 2.5 milliliters of ether. A boron trifluoride-ether complex (7.6 to 7.8 weight percent of boron) was added slowly to the epoxide-ether mixture until 5 milliliters of the complex was included. After permitting the solvent to evaporate, the polymer was recovered. It was a soft, polymeric material.

The monoepoxide of cyclopentadiene may be copolymerized with other epoxides such as ethylene oxide, butylene oxide, styrene oxide, and other epoxides which contain a polymerizable epoxy group. Copolymers of epoxycyclohexene and esters of epoxy carboxylic acids such as allyl 2,3-epoxybutyrate may be prepared.

EXAMPLE IX

Five-thousandths of a mole of the monoepoxide of cyclopentadiene and 0.0025 mole of styrene oxide were dissolved in 40 milliliters of methylene chloride containing $6.0 \times 10^{-4}$ moles of tin chloride. The solvent was allowed to evaporate at 25° C. over a period of 96 hours, and the remaining solids were kept at 70° C. for another 16 hours. A shiny, brittle, black solid polymeric product was obtained.

EXAMPLE X

Five-thousandths of a mole of the monoepoxide of cyclopentadiene and 0.01 mole of styrene oxide were dissolved in 40 milliliters of methylene chloride and $6.0 \times 10^{-4}$ moles of tin chloride were added. After permitting the solvent to evaporate at 25° C. over 96 hours, the solid products were held at 70° C. for an additional 16 hours. A sticky, reddish-brown, semi-solid polymer resulted.

As can be seen by comparison of Examples IX and X, it is possible to widely vary the relative quantities of the monoepoxide of cyclopentadiene and another epoxide such as styrene oxide which are copolymerized. Depending upon the relative quantities of the two monomers which are copolymerized, polymers of varying properties result. With a copolymer formed from a mixture of monomers in which the monoepoxide of cyclopentadiene predominates, the polymers tend to be harder and more brittle. On the other hand, by including a larger proportion of the other oxides such as styrene oxide, polymers which are substantially less brittle and less solid are prepared.

Thus, copolymers of the monoepoxide of cyclopentadiene and another epoxide containing a polymerizable epoxy linkage may be prepared while widely varying the respective quantities of epoxides which are employed. For the most part, the monoepoxide of cyclopentadiene should comprise from 5 or 10 percent to 80 percent by weight of the two epoxides employed to provide the copolymer.

As indicated above, copolymers are most expeditiously formed by the use of a recognized epoxide catalyst. Although copolymers will result without any substantial heating, it is generally advisable to at least facilitate copolymerization by gentle heating, say at a temperature of at least 70° C. Of course, somewhat higher temperatures are also suitable.

The monoepoxide of cyclopentadiene is also capable of reacting with polycarboxylic acids or their anhydrides to yield polymeric type materials, that is polymeric materials usually regarded as polyesters by the resin industry. Typical polycarboxylic acids include phthalic acid, maleic acid, succinic acid, azelaic acid, sebacic acid, fumaric acid and like dicarboxylic acids. Other polycarboxylic acids such as citric, aconitic and tricarballylic acid are also useful in this regard. Anhydrides which may be used are represented by phthalic anhydride, maleic anhydride and carbic anhydride.

EXAMPLE XI

Five-thousandths of a mole of the monoepoxide of cyclopentadiene and 0.005 of a mole of phthalic anhydride were heated at 130° C. for 76 hours. A solid, brown polymer was obtained.

EXAMPLE XII

Five-thousandths of a mole of the monoepoxide of cyclopentadiene and 0.005 of a mole of maleic anhydride were heated for 3 hours at 130° C. to give a clear yellow solid polymeric product.

EXAMPLE XIII

Five-thousandths of a mole of the monoepoxide of cyclopentadiene and 0.005 of a mole of phthalic anhydride were mixed with a trace of water added and the mixture maintained at 130° C. for 5 hours. A hard, brittle, brown solid polymeric product was obtained.

EXAMPLE XIV

Five-thousandths of a mole of the monoepoxide of cyclopentadiene and 0.005 of a mole of phthalic anhydride in the presence of $4 \times 10^{-5}$ moles of dimethyl aniline was heated to 130° C. and held at such temperature for 5 hours. A hard, brittle, brown solid polymer resulted.

I claim:
1. 3,4-epoxycyclopentene.
2. A method of preparing the monoepoxide of cyclopentadiene which comprises epoxidizing cyclopentadiene with a peracid of a weak carboxylic acid in a liquid medium containing sodium carbonate.
3. A method of preparing the monoepoxide of cyclopentadiene which comprises epoxidizing cyclopentadiene with a peracid of a carboxylic acid having a pK value of 0.5 to 5 in a liquid medium containing from 1 to 5 moles of sodium carbonate per mole of peracid.
4. The method of claim 3 wherein the liquid medium includes a water insoluble inert organic solvent.
5. A method of preparing the monoepoxide of cyclopentadiene which comprises epoxidizing cyclopentadiene with peracetic acid at 0° C. to 40° C. in a liquid medium including the reactants, a water insoluble organic solvent and from 1 to 5 moles of sodium carbonate per mole of peracetic acid.

6. A homopolymerizate of 3,4-epoxycyclopentene wherein epoxy groups have been consumed in forming the polymerizate, said homopolymerizate being prepared by heating the epoxide in the presence of a catalyst for the polymerization of said monoepoxide through its epoxy group.

References Cited in the file of this patent
UNITED STATES PATENTS

| | | |
|---|---|---|
| 2,312,535 | Fieser | Mar. 2, 1943 |
| 2,583,569 | Herzfeld et al. | Jan. 29, 1952 |
| 2,754,325 | Smith | July 10, 1956 |
| 2,765,296 | Strain | Oct. 2, 1956 |

OTHER REFERENCES

Wilson: The Chemistry and Utilization of Cyclopentadiene, 1944, reprinted from Chemical Reviews, vol. 34, No. 1, February 1944, page 13.

Swern: Chem. Reviews, vol. 45, August 1949, pages 16–25.

Chemical Abstracts, vol. 46, 1952, pages 5883, 5884, 5923 and 5924.

Beilstein: Organische Chemie, vol. 5, 2d supp., page 78.

UNITED STATES PATENT OFFICE

CERTIFICATE OF CORRECTION

Patent No. 2,916,462            December 8, 1959

Malcolm Korach

It is hereby certified that error appears in the printed specification of the above numbered patent requiring correction and that the said Letters Patent should read as corrected below.

Columns 3 and 4, Table I, fourth column thereof, for the heading "Po Temperature, ° C." read -- Pot Temperatures, ° C. --; same Table I, under the heading "Cut Temperature, ° C.", first line thereof, for "22-20" read -- 22-27 --; column 4, line 1, for "eneumerated" read -- enumerated --.

Signed and sealed this 4th day of April 1961.

(SEAL)
Attest:    ERNEST W. SWIDER

XXXXXXXXXXXX
Attesting Officer

ARTHUR W. CROCKER
Acting Commissioner of Patents